UNITED STATES PATENT OFFICE.

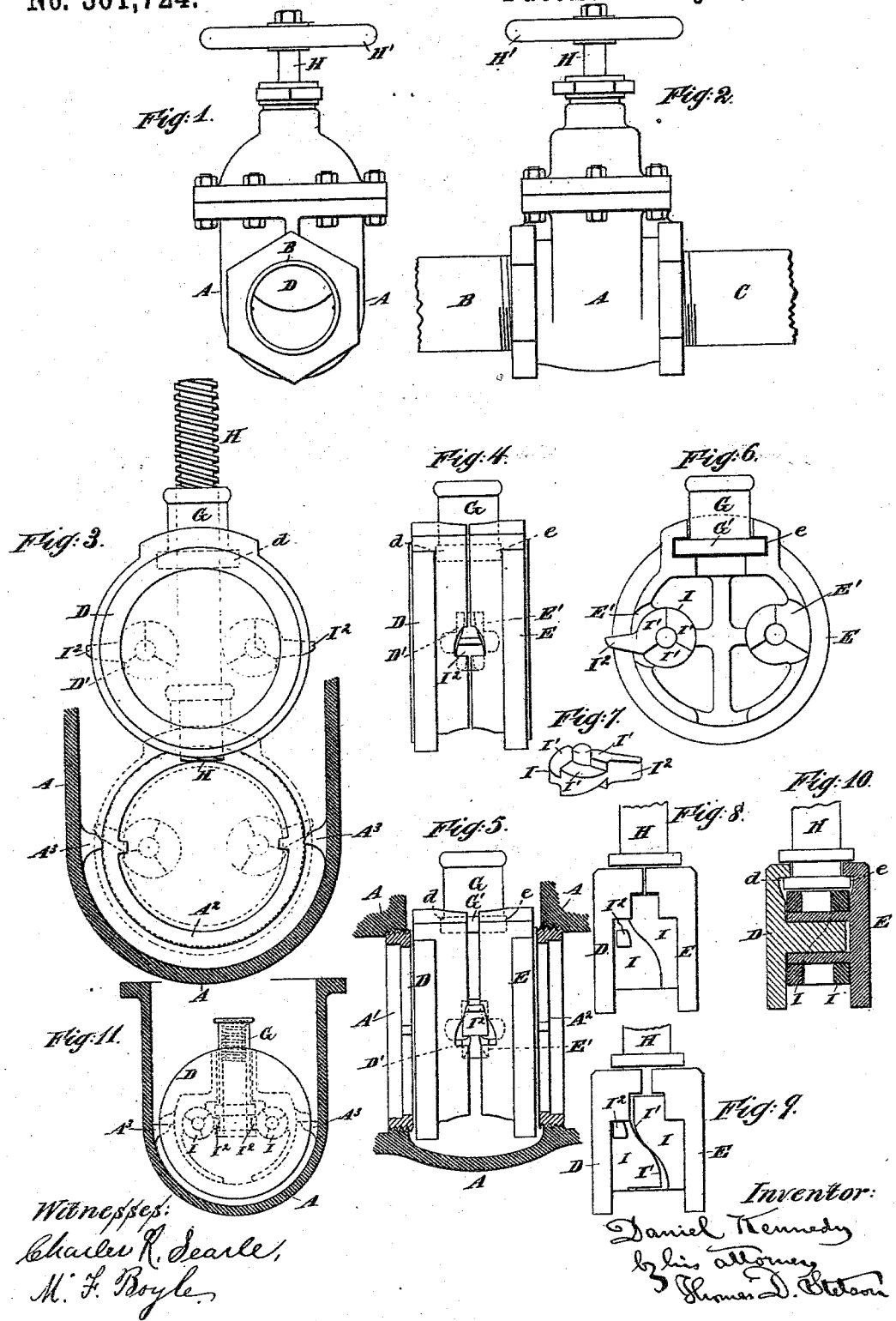

DANIEL KENNEDY, OF NEW YORK, N. Y.

STOP-VALVE.

SPECIFICATION forming part of Letters Patent No. 301,724, dated July 8, 1884.

Application filed February 20, 1884. (No model.)

*To all whom it may concern:*

Be it known that I, DANIEL KENNEDY, of New York city, in the county and State of New York, have invented certain new and useful Improvements in Stop-Valves; and I do hereby declare that the following is a full and exact description thereof.

The improved valve is adapted for use in stopping or controlling water, steam, and other fluids under any and all pressures. I will describe it as applied to a water-pipe—it may be a street-main. It is of the class in which a clear water-way is left for the water to flow directly in a straight line the full size of the pipe when the valve is entirely open. The casing is constructed with two parallel faces corresponding nearly to the abutting ends of the pipes. The valve is in two parts, adapted to form a tight contact with the faces, respectively, by a force tending to separate the two parts of the valve. To open the valve the pressure tending to separate the two parts is first relaxed, and thus the whole is drawn away in a direction at right angles to the axis of the pipe. The separating-force is induced by two semi rotating wheels, which are mounted between the two parts of the valve, and are formed with helicoidal screw or spiral wedge-like surfaces matching against corresponding surfaces on the adjacent portions of the valve. Each wheel is provided with an arm which extends outward beyond the edge of the valve. Stops are provided in the casing adapted to be struck by these arms near the extreme lowest position. When the valve is forced strongly into its position between the two abutting annular surfaces, the projecting arms strike against a stop and compel the partial revolution of each of the wheels. This wedges the two parts of the valve apart and causes them to make tight-fitting contacts with the annular faces. When a force is applied sufficient to move the valve to open it, the commencement liberates the arms from their contact with the stops against which they have been resting, and the force of the water or other fluid urging the two parts of the valve together, acting on the quick screw faces or helicoidal faces, compels the rotation of each wheel in the direction which allows the valve to contract its thickness. This reduces the friction of each valve-face against its corresponding annular bearing or seat. The valve opens in this condition, and may remain open for any length of time. On being closed it closes in the same condition until the valve is between the two annular surfaces. At this stage the arms strike a set of stops, and are rotated in the direction to separate the two parts of the valve. This induces a tight fit of each part respectively against its proper annular bearing-surface. The valve may remain in this condition, tightly closing the passage for any length of time.

The following is a description of what I consider the best means of carrying out the invention.

The accompanying drawings form a part of this specification.

Figure 1 is an end view, and Fig. 2 a side view, showing the exterior. The remaining figures show the interior. Fig. 3 is a section through a portion of the casing and a face view of the valve. The strong lines show the valve in the open, and the dotted lines in the closed, position. Fig. 4 is an edge view of the valve in the open position. Fig. 5 is a corresponding view of the valve, with a section of the immediately adjacent parts, showing the valve in the closed position. Fig. 6 is an inner or back face view of some of the parts of the valve. Fig. 7 is a perspective view of one of the wheels with the arm by which it is turned as the valve is operated. Figs. 8, 9, and 10 represent a modification. Fig. 8 is an edge view showing the valve in the open condition. Fig. 9 shows the same with the valve in the closed condition. Fig. 10 is a central longitudinal section showing the parts in the condition corresponding to Fig. 8. Fig. 11 is a cross-section through the casing of a modification.

Similar letters of reference indicate corresponding parts in all the figures.

A is a casing, certain portions of which will be designated, when necessary, by additional marks, as A' A². It is of cast-iron or other suitable material, and makes strong and tight junctions with two lengths, B and C, of the pipe. The construction affords a clear passage through the casing, except when the valve is interposed. On the inner faces of the casing A are annular lips A' A², surrounding the water-orifices, and finished with plane surfaces adapted to form tight fits with parallel plane surfaces on the two parts of the valve. These may be formed separately and screwed in, as shown.

D and E are the two parts of the valve, each nicely finished, with its outer face plane, and with its inner face formed with two helicoidal surfaces, D' E'. The upper portion of each part D E is provided with grooves $de$, adapted to engage the wings G' of a sleeve, G, which latter is held against a turning motion, but allowed to move longitudinally, and is threaded to receive a screw-thread cut on the operating-shaft H, which is collared in a bearing in the top of the casing, equipped with a stuffing-box, and provided with a hand-wheel, H', by which the screw may be conveniently turned. The two parts of the valve are so formed that there is room for the screw H to extend down through the space between the parts D E, or, rather, for the valve to be lifted into the space on each side, respectively, of the screw.

I I are peculiarly-shaped wheels of cast-iron or other suitable material, having each face formed with three or other convenient number of short helicoidal faces, I', matching to the corresponding helicoidal surfaces, D' E', on the two parts of the valve.

A³ A³ are fixed stops cast on or otherwise produced within the interior of the casing A, in the required position to be struck by the arms I² when the valve is very nearly in its fully-closed position. They compel the wheels I to be partially revolved by the completion of the closing movement of the valve. This partial revolution forces the two portions D and E of the valve apart. It presses the outer face of the part D against the lip or annular projecting surface A', and the outer face of the part E against the annular surface A². The valve is now tightly closed.

When it is desired to open the valve, the operator turns the hand-wheel H, to induce a lifting motion on the valve. Both parts D and E commence to rise with a strong friction of their outer faces against the lips A' A², respectively; but so soon as they have been thus moved a little distance the pressure of the fluid on the valve, acting against the helicoidal surface D' E', causes the wheels I I to be revolved in the direction to allow the parts D and E to approach each other. The parts so approach, and the motion relieves the friction of the valve against the faces of D and E, and allows the remainder of the opening motion to be completed without resistance from friction. When the hand-wheel H' is turned in the opposite direction, the closing movement of the valve is performed without friction until the arms I² again strike the stops A³, when the two parts D and E are again forcibly separated by the wedge-like action of the helicoidal surfaces I' on the wheels against the corresponding helicoidal surfaces, E', on the inner faces of the valve parts, and the passage of the water is tightly stopped, as before.

I propose as a modification, to which I attach much importance, to carry out this invention on small valves by employing two wheels corresponding to I, but superposed one upon the other in the center of the parts, respectively. The faces of these two wheels, which are presented toward each other, may be plane, and only the outer faces made helicoidal, and adapted to serve wedgewise; but in carrying out this form in the best manner I propose to have both faces of each wheel helicoidal, the inner faces matching against each other wedgewise, and the outer faces matching against the inner faces of the valve parts D and E wedgewise. Such a modification is shown in Figs. 8, 9, 10. The invention insures that the force applied to separate the two parts of the valve is applied very evenly. It allows the necessary amount of separation and approach to be effected with a small amount of bodily motion of the valve. The bearing-surfaces are ample and not likely to be changed by wear. One or both parts may be tilted within considerable limits by the presence of a chip or other solid particle under the face without inducing mischief.

In the modification shown in outline in Fig. 11 the two parts D and E of the valve are provided with stops corresponding somewhat in function to the stops A³, which, when the valve has been depressed to the fully-closed position, strike on the fixed stops A³ and are supported firmly, thus preventing a further descent of the valve.

The screw-shaft H is formed with two collars near its lower end, which embrace between them an arm from each of the helicoidally-faced wheels I. These arms correspond in function with the arms I²; but they extend inward instead of outward from the respective wheels I. So long as the valve is being raised or lowered by the screw-shaft H its parts D and E are allowed to lie close together; but when, by the turning of H, the valve has been lowered, so that it rests on the stops A³, the further turning of the screw-shaft H in the direction to lower the valve, by further depressing the collars near its lower end, turns the wheels I in the direction to force the parts D and E apart. This urges them tightly against their seats A' A², and the valve is closed. The effect in opening the valve is obvious. The turning of the screw-shaft H in the direction to raise it first by the action of the collars near its lower end turns the wheel I in the direction to liberate the parts D E of the valve and allow them to close together, thus relaxing them from their seats against A' A². Then the further turning of H lifts the valve. The lifting and holding suspended, the weight of the valve may be effected by the engagement of the uppermost of the two collars with a proper offset in each part of the valve, as indicated in Fig. 11.

I am aware that two-part valves have been provided with inclined faces, and that a sleeve operated by the threaded rod has had corresponding faces, whereby the action of the rod has served to move such faces on each other and to spread the valve. This construction is not sought to be covered in this application.

What I claim as new is—

1. In a stop-valve, substantially as described, a case, as A, having stop $A^3$, combined with a two-part valve, D E, an operating-rod connected directly with said valve, and two wheels arranged between the parts D E, and having helicoidal faces and projecting arms to engage the stops $A^3$, as and for the purposes set forth.

2. The combination, with the case A, having internal stops, $A^3$, and the screw-rod H, having collar $d$, of the valve, parts D and E, engaged with said collar, the wheels I, having helicoidal faces $I'$, and arms $I^2$, and arranged between the parts D and E, so that the said arms $I^2$ will engage the stops and turn the wheels upon each other to separate the parts D and E as the pipe is closed, as herein specified.

In testimony whereof I have hereunto set my hand, at New York city, New York, this 15th day of February, 1884, in the presence of two subscribing witnesses.

DANIEL KENNEDY.

Witnesses:
CHARLES R. SEARLE,
M. F. BOYLE.